(12) United States Patent
Hinkel

(10) Patent No.: US 9,438,862 B2
(45) Date of Patent: Sep. 6, 2016

(54) SURVEILLANCE CAMERA ARRANGEMENT

(75) Inventor: Ralf Hinkel, Horingen (DE)

(73) Assignee: MOBOTIX AG (DE)

( * ) Notice: Subject to any disclaimer, the term of this patent is extended or adjusted under 35 U.S.C. 154(b) by 538 days.

(21) Appl. No.: 13/990,241

(22) PCT Filed: Dec. 2, 2011

(86) PCT No.: PCT/DE2011/002067
§ 371 (c)(1),
(2), (4) Date: Aug. 19, 2013

(87) PCT Pub. No.: WO2012/095068
PCT Pub. Date: Jul. 19, 2012

(65) Prior Publication Data
US 2014/0055612 A1 Feb. 27, 2014

(30) Foreign Application Priority Data
Dec. 3, 2010 (DE) .................. 10 2010 053 181

(51) Int. Cl.
*H04N 7/18* (2006.01)
*G08B 13/196* (2006.01)

(52) U.S. Cl.
CPC .......... *H04N 7/18* (2013.01); *G08B 13/19656* (2013.01); *G08B 13/19665* (2013.01)

(58) Field of Classification Search
CPC .............. H04N 7/18; G08B 13/19665; G08B 13/19656
USPC ........................................... 348/143
See application file for complete search history.

(56) References Cited

U.S. PATENT DOCUMENTS

| 5,982,418 A | 11/1999 | Ely | |
|---|---|---|---|
| 2007/0300272 A1* | 12/2007 | Takanezawa | H04N 7/17318 725/105 |
| 2008/0145023 A1* | 6/2008 | Candelore | H04N 5/76 386/201 |
| 2010/0033577 A1* | 2/2010 | Doak | H04N 7/181 348/159 |
| 2011/0181729 A1* | 7/2011 | Lee | H04N 5/232 348/159 |

FOREIGN PATENT DOCUMENTS

| DE | 10 2006 018 959 | 10/2007 |
|---|---|---|
| WO | 03/001809 | 1/2003 |
| WO | 2005/027068 | 3/2005 |
| WO | 2007/069658 | 6/2007 |
| WO | 2009/111377 | 9/2009 |

* cited by examiner

*Primary Examiner* — Allen Wong
(74) *Attorney, Agent, or Firm* — Salter & Michaelson

(57) ABSTRACT

The invention relates to a surveillance camera having a network interface and a storage means for video data storage within the camera. In this context, it is provided that the storage means is designed for storing video data to be stored in at least one other camera accessible via the interface and/or for storing video data received from at least one other camera via the network interface.

20 Claims, 1 Drawing Sheet

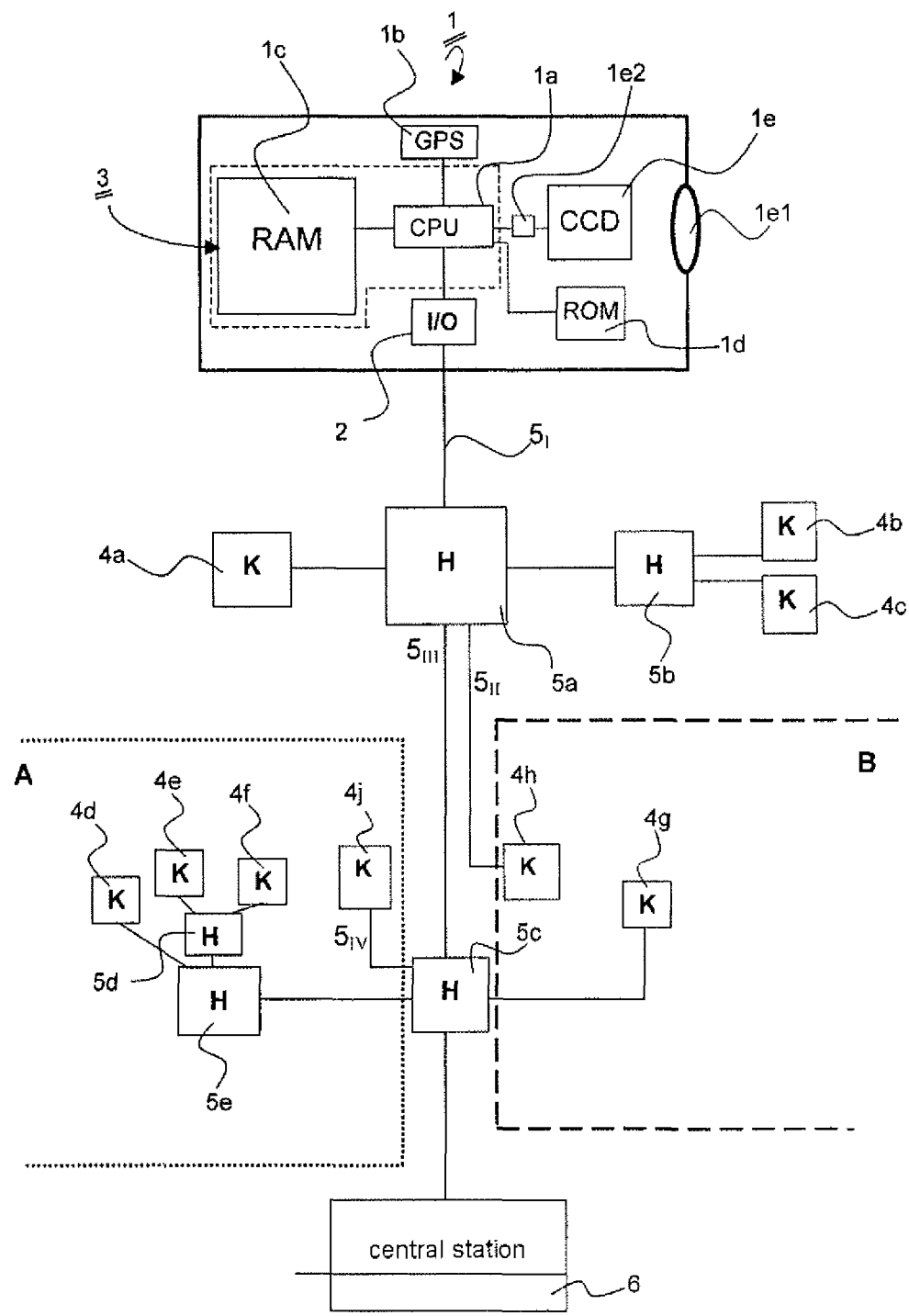

SURVEILLANCE CAMERA ARRANGEMENT

TECHNICAL FIELD

The present invention deals with the operation of surveillance cameras.

BACKGROUND OF THE INVENTION

As a rule, surveillance cameras require the images or image sequences, respectively, recorded by means of the cameras to be stored at least temporarily for backup and documentation purposes. In cases in which a possibly relevant event has been recorded by means of the surveillance cameras, such storage allows the images recorded during this event to be subsequently viewed and evaluated, if necessary.

On the one hand, the storage can take place in a central station which has the advantage that the data can be protected particularly well from loss. However, it is disadvantageous that at a node to which the data are transmitted for storage, it is loaded considerably by the necessity of storing the data.

It is also possible to store data locally on the imaging cameras. This reduces the network load but means at the same time that a loss of data cannot be excluded, especially not where the cameras are exposed to detrimental environmental conditions and can be destroyed as a result or are exposed to vandalism and theft.

It is desirable to produce increased protection against loss of stored video data without any extreme network loading at nodes.

The object of the present invention consists in providing a novel feature for commercial application.

The achievement of this object is claimed in independent form. Preferred embodiments are found in the subclaims.

SUMMARY OF THE INVENTION

The present invention thus deals with a surveillance camera having a network interface and a storage means for video data storage within the camera. In this context, it is provided that the storage means is designed for storing video data to be stored in at least one other camera, accessible via the interface and/or for video data received from at least one other camera via the network interface.

A first fundamental concept of the present invention thus consists in the finding that the protection can be increased quite simply by additional data storage outside the image-recording camera but within another camera, that is to say within a B-party camera without increasing the network load extremely at nodes. In this context, this additional data storage in a B-party camera takes place additionally in as much as it protects the data additionally to the storage in the image-recording camera itself. Since cameras are designed alternately for protecting the video data of another camera in each case, there is always only at least largely local data traffic present for protection which does not have to be sent via a central node or the like. This is particularly advantageous especially in the case of branched camera systems. In addition, cameras of surveillance systems, as a rule, have in any case a memory for optional access, for example an SD card memory, where the SD cards, although they are preferably removable from the camera, should be preferably readable by data retrieval at the same time. It should be mentioned that other memories apart from SD cards can also be used. The storage means is used for feeding certain data streams actively to a memory.

Video data will comprise typically, but not mandatorily, other data apart from the actual image data, for example the audio data stream from typically provided microphones of the cameras, time markers in the case of events registered at or with the camera such as tremors, GPS data etc. Incidentally, it should be mentioned that the data can be compressed alone or jointly, for example by means of conventional Codecs. In this context, it is also possible later to access data from different cameras, if necessary, in the case of compressed data for the purpose of decoding, for instance if there is differential storage of images and only the reference frame is present in one memory whereas only the differential data related to it are available from other cameras.

In systems in which more than two cameras are provided which can store video data alternately, means for the selection of one or more B-party cameras, in which their own images are stored (additionally) are provided in one preferred embodiment according to the invention. These means are typically designed for making a selection in different ways, taking into consideration different aspects, respectively, also of several different aspects at the same time. It is thus possible to determine the camera in which it is intended to store by means of a system administrator input; such non-automatic determination is reasonable, for instance, if the overall system is installed completely in any case and corresponding plans are taken into consideration from the start, for instance by design of the network topology, the distance which installed cameras have from one another etc. The selection means can also take into consideration hazard zones in which the respective surveillance cameras are arranged. For this purpose, means are typically provided in the cameras in which a hazard zone can be noted. This can be specified, for example, during the installation or at a later time by the system administrator. In this manner, it is possible to take into consideration, for instance, that, for instance, two cameras which otherwise would possibly store data alternately are both arranged in the same area at risk from vandalism; in such a case, data are transferred better to other cameras in areas less at risk. The same applies, for instance, in warehouses with a fire hazard for cameras monitoring rooms not separated from one another by fire protection walls. Taking into consideration such hazard zones is particularly advantageous in as much as these may not be detected automatically by a camera although the constructional adaptation of the camera to certain hazards such as explosion protection, protection again vandalism and the like, if necessary, may provide indications of the hazards to which a camera is exposed. Such special features of a camera, which are possibly noted already during the production on internal memories can also be taken into consideration by the means for selecting the destination camera, namely as an indication for mounting it in a hazard zone. Protection against explosion, protection against vandalism, weather resistance can be mentioned as important constructional indexes which can be noted in a camera-based memory.

It is also possible to utilize the distance of the camera from other cameras accessible via the network interface in the selection. This is reasonable as sole criterion especially where no different hazard zones are present. Otherwise, different, aforementioned or subsequently still discussed criteria can be taken into consideration in a mixed manner.

The distance from other cameras accessible via the network interface can be determined in different ways. On the one hand, cameras can be equipped with GPS sensors, if necessary, and the position signals determined by means of the internal GPS sensors can be exchanged or transmitted. By determining the distance between the respective sights, the distance can then be taken into consideration well during the selection of the target camera but does not mandatorily need to take place autonomously. It is possible to use one or more central positions for determining the distances from one another.

Alternatively and/or additionally, it is possible to determine transit times of data packets to other cameras in the network and use these for determining distance. In this context, it must be taken into consideration that, on the one hand, a particular minimum distance is desirable but, on the other hand, the distance must not become so large that the overloading of network nodes which should actually be avoided occurs again for the mutual protection of the camera images. It is, therefore, possible to also use further information, especially the routes which can be easily determined by conventional protocol techniques in local networks, especially in the determination of the target camera by data packet transit times, in order to ensure that, for example, although one or two switches or routers, respectively, are located between the cameras exchanging data which, in the case of typical network topologies, looks like an adequate distance, overloading of central nodes is avoided, however, on the other hand. It should be pointed out that it is especially preferred if, if necessary, the selection of one or more target cameras which are addressed by a given camera is negotiated with other cameras present in the surveillance system. For this purpose, for example, desired target cameras can be selected iteratively initially taking into consideration one's own criteria and without consideration of the data storages from other cameras to third cameras. The surveillance cameras of the system can then mutually exchange which respective cameras are to be addressed by other cameras and it is possible to autonomously determine whether network section overloads occur due to such a selection taking into consideration purely local inputs and/or whether individual cameras receive too many data from B-party cameras. For such a case, arbitration means or mechanisms which, on the one hand, take into consideration how well other B-party cameras on which storage could occur instead, would be accessible to a camera in addition to the target camera initially desired and how high the total loading is for the network or a given node, respectively, if certain cameras store their data in desired or predetermined target cameras are preferably provided in highly complex systems.

It should be pointed out that, if necessary, the information obtained via data packet transit times and on sending data packets (for instance due to "PING" enquires) can be used for determining the entire network topology or at least local parts thereof. The responding cameras can then be selected locally in each case separately by a single camera and/or determinations can also be specified for other cameras by a camera adopting an administrator or supervisor, respectively, or master mode. In this context, in a preferred embodiment, all cameras of a system can be capable of assuming a master function, if necessary. It should be pointed out that this is possible especially by means of corresponding camera programming, which also applies to other features according to the invention.

It is possible and preferred that a list of priorities is set up in which the order of desired target cameras is registered and, if necessary, a measure is stored for the advantage possessed by the individual camera sending video data and/or by the total system due to the consideration of the respective order.

It should also be pointed out that it is possible and preferred to combine the relevant information repeatedly, for example if it is found that the topology of the network has changed due to the distance, the defect or the like of an individual camera or due to the addition of a further or several further cameras. To ensure network stability in this case, it is preferred to regularly exchange information which can be carried out by enquiring from the nearest neighbors and possibly due to the fact that the addition or lack of cameras in the overall system is reported by broadcasting an advisory signal to a multiplicity of cameras or all cameras.

It should also be pointed out that, if necessary, a stochastic selection among a number of B-party cameras can take place additionally and/or alternatively. It should be mentioned that, incidentally, especially B-party cameras can tender stochastically for video data storage. This applies especially in surveillance networks in which no sabotage is to be feared or in which the B-party cameras, from which tendering for video data storage is accepted, can be specified, for example, by a fixed topology.

Stochastic storage produces particularly high sabotage protection since it is not easily possible to determine to which B-party camera particular data are sent. If data are fed in at a number of B-party cameras, it is particularly preferred to provide for the retrieval of video data of a particular event, for example for the purpose of evaluation in a central station by broadcasting of a corresponding request signal.

According to the invention, it is not mandatory that the storage of video data in B-party cameras is initiated continuously. Instead, it is possible to initiate an event-based storage and/or perform an event-based B-party camera selection. The events can be initially the simple attainment of a particular time. In such a case, the feeding-in of video data is thus delayed, for example until a particular amount of video data has accumulated. By suitably determining, if necessary, the transmission times between different cameras in this case, it is avoided that due to transmission attempts in a network or node already highly loaded, additional data traffic not directly used for immediate storage occurs. Moreover and/or additionally, it is possible to trigger the storage of video data for certain events. This can be the case, for example, if by means of the surveillance camera generating video data and outputting video data to B-party cameras a critical situation is found, for instance a rise in temperature indicating a fire, a burglary detected by automatic video data determination or a burglary detected by other alarm sensors such as glass breakage sensors. It is possible that a triggering trigger signal or several masked single triggers are jointly used for storing video data also a particular time before or after an activating event. This enables images also of other cameras still to be stored, which the perpetrator has possibly passed shortly before for instance when a shop window of a relatively long shop window front is battered. If necessary, the advance or trailing, respectively, can also be chosen in dependence on which camera outputs a trigger signal, for instance in order to take into consideration the spatial distance from this camera. It is also possible to use the arrival of video data from B-party cameras as activating event following which video data are fed to B-party cameras. It should be pointed out that the triggering of the storage of their own video data in B-party cameras can take place both via the network interface in accordance with conventional network protocols such as TCP/IP or the like, but that the use of other transmission channels is also possible in order to render eavesdropping more difficult. It is also possible that a camera, due to self-affected events or events determined by means of sensors close to the camera request B-party images from other cameras, for instance from adjacent B-party cameras. This may facilitate where possible the later evaluation of the data obtained for a given event and is considered by itself to be inventive and worthy of protection.

It should be noted that in this description, any other surveillance camera mounted spatially separately, which can be reached via the network interface is preferably understood to be a "B-party camera".

This is particularly appropriate especially when at least one camera is connected additionally to an alarm sensor such as a fire alarm, a burglary alarm system etc. and it is necessary to determine in such cases whether relevant video data have been detected by other cameras. Incidentally, it can be provided that even when a situation which is relevant per se is present, to delay the storage of video data in B-party cameras especially when a high network load is to be expected due to the activating event, for instance because in the case of a beginning fire, all video data must be saved initially as quickly as possible from the cameras arranged in the fire zone so that cameras located outside the fire zone preferably wait with the storage of their own images into B-party cameras. This indicates that it is considered to be advantageous according to the invention if the storage means are designed for time-displaced storage and/or for storage taking into consideration the network loading. It should be mentioned, incidentally, that compressed data are preferably transmitted for storage, it being possible to use methods known per se for the compression; for example, the reduction in frame rate and/or the reduction of resolution and/or the reduction to particularly relevant areas should be mentioned.

Incidentally, it is possible and also distinctly preferred especially in high security systems to transmit video data belonging to an event to several B-party cameras addressable via the network interface for protection purposes.

The storage means is preferably designed for storing images from other cameras only for a fixed time and/or overwriting video data cyclically. This ensures that video data which are too old in a memory of a camera having too high a memory filling level do not conflict with a new storage. Typically and preferably, the memory area to be overwritten cyclically is permanently allocated to a B-party camera during the negotiation phase, that is to say it can be estimated or determined from the start how old data will become in the memory before the cyclical writing or, respectively, when they should be deleted. Preferably, however, warning means are provided especially when the storage means are designed for overwriting video data cyclically in order to point this out to a system administrator or the like if very many data arrive unexpectedly very shortly after one another. In this manner, a sabotage act can be noted, for example, by means of which a camera memory having data relevant per se is to be "flushed out" by writing in less relevant data. It should be mentioned that possibly a storage can also be preferably prevented if such a or similar irregular transmission pattern occurs. For this purpose it can be specified, for example, how many data may arrive within a certain period, that is to say a critical threshold can be specified.

It should be pointed out that it is preferred to store images stored in with specification of the imaging camera and/or with notification of an event triggering the image storage and/or in the image recording or image storage time, in such a manner that a retrieval can also take place with specification of these identifiers, if necessary, for instance by broadcasting. Such a broadcast signal can be sent out especially by a central station, that is to say a server provided there or a user located in the central station. In cases in which an especially high eavesdropping or sabotage protection is required, such an enquiry can be dispatched preferably encrypted. Furthermore, local events determined can possibly be logged and/or it can also be logged to which B-party cameras (and possibly when) images have been output.

DESCRIPTION OF THE DRAWINGS

In the text which follows, the invention will be described only by way of example by means of the drawing in which:

FIG. 1 shows a surveillance camera arrangement according to the present invention.

DETAILED DESCRIPTION

According to FIG. 1, a surveillance camera 1 generally designated by 1 comprises a network interface 2 and a storage means 3 for storing video data, for instance within a camera. The storage means 3 being designed for storing video data to be stored in at least one other camera 4 accessible via the network interface 2 or for video data received from at least one other camera 4a-4j via the network interface 2.

In the present exemplary embodiment, the camera 1 is a video camera which is capable of delivering a continuous stream of high-resolution video data, for instance to a network 5 via the network interface 2. The camera 1 has a CPU 1a, a GPS sensor 1b, a random-access memory such as RAM 1c, a flash memory, for example an SD card memory etc., and a read-only memory ROM 1d. The random-access memory ic can be implemented as a memory which can be exchanged from the outside, for example as a memory card, for example as SD card. Using SD cards is particularly appropriate where video data are to be stored protected against current interruptions. From this it follows that, in addition to SD cards, other memory technologies, including future ones, can be considered which have the property of protection against current interruption.

Furthermore, a CCD sensor 1e having associated optics 1e1 and a corresponding signal conditioning circuit 1e2 is provided which jointly generate digital video data and feed these to the CPU.

It should be pointed out, that the B-party cameras 4a-4j, which are shown by way of example, have in this case an internal structure identical to those of the surveillance camera 1 and a different reference number has only been selected in this respect in order to facilitate easier distinction between a first surveillance camera 1 and the further cameras 4 in the network; for this reason, cameras 4 are also called "B-party camera".

The cameras are also designed for conveying certain events to the central station, for example the detection of increased temperatures which can be detected by temperature sensors, not shown in the FIGURE, tremors which indicate a sabotage attempt, by image evaluation, for example movements detected in otherwise empty areas, events determined etc., and it should be pointed out that the central station can be constructed for displaying images from surveillance cameras cyclically and/or in the case of such an event automatically on one or certain monitors.

The central station is also preferably constructed for archiving such events.

In the present case, the network interface 2 is designed for communicating with matching stations via a standard network. This can be carried out via TCP/IP protocols or the like. It should be mentioned that, incidentally, a link to other cameras is possible via different communication channels and paths, for example simultaneously via LAN, WLAN and UTMS.

In the exemplary embodiment shown, the network 5 is shown as a hard-wired network which has a multiplicity of hubs 5a-5e which communicate with each other via lines, as do the cameras which communicate with the hubs via fixed lines. In the present case, a surveillance center 6 is connected to the hub 5c, in which images from the various surveillance cameras 1, 4a-4j come together.

The network interface 2 is designed for transmitting images not only to the central station but, for protection purposes for storage in the random access memory of other cameras 4a-4j, also to these cameras after their selection as will be described in the text which follows.

The surveillance camera 1 is also capable of transmitting the signals of its own GPS sensor to other cameras. The network interface 2 is designed for determining in interaction with the CPU 1a the transit time of a data packet to other surveillance cameras identified in the network, and back, for example via a PING process, and during this process also determining the path taken by the data packets, particularly the number of routers passed to the B-party camera 4a-4j addressed in each case. The transit time is a measure of the distance between the cameras, taken into consideration any given network load since very high network loads on a network section can possibly lead to the transmission of a data packet taking a longer time. Thus, for example, it will be possible to estimate that in FIG. 1, the data transit time forward and back between the surveillance camera 1 and the surveillance camera 4j will be longer than the data transit time between the surveillance camera 1 and the surveillance camera 4h. The reason for this is that data from surveillance camera 1 to surveillance camera 4h only need to pass through one hub 5a and the network sections 5I, 5II in each case are loaded only with data of a single camera whilst signals of cameras 4a, 4b, 4c and 1 need to be transmitted via the network line section 5III and hub 5c, as the hub nearest to the central station 6, needs to transmit the entire network traffic. Even when the length of data line 5II thus approximately corresponds to the sum of data line lengths 5III plus 5IV, a data packet is thus exchanged more rapidly between camera 1 and camera 4h, assuming identical hubs etc., than between camera 4j and camera 1 since data packets do not need to wait as long until the network lines are available for the transmission or do not need to share the transmission channels, respectively.

The surveillance cameras 1, 4a-4h are designed for tabling the data transmit times to respective adjacent cameras and exchanging the corresponding tables mutually thereafter. In this manner, each surveillance camera is provided with information about the network topology in the embodiment described here, as is preferably possible.

The surveillance cameras 1, 4a-4h are also arranged in different areas marked as A, B, C in FIG. 1. In this context, zone A can be, for example, a warehouse at risk from fire, zone B can be an office area and zone C can be outside terrain. The cameras arranged in the different zones in each case are constructionally adapted correspondingly. Thus, cameras 4d, 4e, 4f, 4j are constructed to be protected from explosions which requires corresponding constructional designs of the cameras known per se to the expert. Cameras 1, 4a, 4b, 4c in the outside zone C are constructed to be weatherproof whilst cameras 4h, 4g provided in the office and entrance area B do not need any special protective measures. The corresponding housing design, that is to say protection against fire, weather resistance etc., are stored permanently in the clean read-only memory ROM 1d of each camera, together with other information, especially the operating system of the camera.

The cameras are arranged or programmed, following the reception of a data packet determining the network structure, to transmit the corresponding information to the transmitting camera and the transmitting camera is designed for tabling this information obtained back. Cameras 1 to 4h are also designed for transmitting the location signals detected by their GPS sensors to other cameras and these signals, too, are also stored.

The random access memory is arranged in such a manner that, on the one hand, the tabled network information, that is to say the distance and constructional design of B-party cameras determined can be deposited which, in view of the possibility of deposition in coded form is possible without excessively large memory requirement even with large networks; however, the possibility should be noted to store, if necessary, only network parts; if necessary, the B-party cameras to be tabled can be selected, taking into consideration transit times which are not too large, but different hazard zones and spatial association of cameras which are far distant.

In the central station 6, the signals from all cameras come together and can be displayed on monitors and possibly also stored. It is possible to provide fewer monitors in the central station than there are surveillance cameras provided in the network and to select among cameras to be displayed in each case cyclically, stochastically or in accordance with other criteria. It is not required to send all images of all cameras permanently to the camera or permanently archive them there.

The cameras are also equipped with synchronized timers which are also transmitted with the respective images and/or can be stored with these.

The random access memory 3 comprises an area for storing the images detected with the camera-based imaging system and for depositing images obtained from B-party cameras, noting the respective imaging camera, an event triggering the image transmission from the B-party camera such as standard storage, excessive temperature, tremor etc., and the corresponding time markers during image recording, and a database-like table or the like is provided in which it is stored which video data are to be allocated to which events or times.

The central station 6 is also designed for transmitting data not only on the path of the point-to-point communication between cameras and the central station but, if necessary, also requesting information relating to particular events such as increased temperatures, sabotage attempts or the like, respectively, relating to periods in which such events have occurred, by sending out a broadcast signal to all camera units and collecting and assembling the information subsequently arriving from different cameras following such a request so that, after arrival of all data relating to a particular event from all cameras, the corresponding video data are available. It should be mentioned that, if necessary, a broadcast can be sent only to particular cameras or camera groups, respectively. For instance, it is thus appropriate, in the case of the occurrence of an increased temperature in a zone at risk from fire, to retrieve, on the one hand, images from all cameras in the respective hazard zone, that is to say, in the example of fire hazard zone A from cameras 4*d*, 4*e*, 4*f*, 4*j* and if necessary also from the outside area around a hall at risk from fire so that a broadcast needs to address cameras 1, 4*a*, 4*b*, 4*c* and 4*d*, 4*e*, 4*f* and 4*j* but not the cameras from the office area.

The arrangement is used as follows:

Initially, network 5 is set up and cameras 1 and 4*a*-4*j* are mounted and the central station is taken into operation.

After activation of all cameras, the cameras initially exchange data packets with one another in order to determine distances from one another detected by GPS signals and data packet transit times, and to determine the cameras accessible in a network. From the information thus obtained, tables are set up by each camera. These tables are exchanged, in turn, so that, after this exchange has been carried out, each camera has information on which other cameras are present in the network, how far these cameras are distant from their own site and how close other cameras are located to third cameras, in turn. It should be pointed out that the corresponding information about data packet exchange possibly requires that the surveillance camera system works under operating conditions, that is to say an operation actually takes place already in deviation from the preceding description. If an intensive data exchange of video data is to take place for storage in the camera-based random access memories of other cameras and, as a result, the network infrastructure is also loaded noticeably, it may be appropriate to repeat the corresponding determinations as soon as the network is operating completely or approximately under the usual operating conditions. This can be carried out by repeated measurement of the response times or the like, for example iteratively.

After setting up the tables about the distance of the local camera to B-party cameras and the exchange of the corresponding tables, it is then specified which of the cameras determined in the network are suitable for storing the local images. Thus, a list of priorities of the available B-party cameras is generated, a given B-party camera being allocated a high priority according to the greatest possible spatial distance with shortest possible data transit time and the arrangement in another zone which is as safe as possible whilst B-party cameras which are accessible only via slow links, which are also close and in the same hazard zone, receive low priority.

It is then possible to exchange between the cameras which respective B-party cameras of other cameras are taken into consideration and, if necessary, a correction can already be made in advance if it is found, for instance, that certain individual cameras would also receive video data from very many third cameras.

Once the respective B-party cameras to be used for safety data storage have been determined in this manner, the actual surveillance can begin. In this process, video data are fed to the central station 6 as required and, for the rest, a video data stream is deposited continuously in the local random-access memory of the respective cameras. At the same time, at least one camera, to which the images are also transmitted for protection purposes, is selected in accordance with the list of priorities. Among the prioritized cameras, this camera can be varied stochastically or cyclically so that not all backup images of a camera are deposited continuously in the camera-based random access memory of one and the same B-party camera. In this manner, during operation a backup video data stream is output continuously from a surveillance camera to one or more B-party cameras for camera-internal storage there and deposited in the B-party cameras camera-internally. During this process, there is no fear that the central station or nodes close to the central station such as in this case, for example, the hub 5*c*, will be loaded with the backup data.

It is possible to output the video data to be saved in B-party cameras not continuously but sequentially. Thus, there can be temporary storage, for instance for a short period such as one minute and then the video data accumulated during this time and preferably already assigned to certain target cameras can be transmitted to these block by block. This can benefit communication further due to the then streaming-like saving. In cases in which certain events are detected with the cameras, for example by sensors provided therein or by image evaluation, immediate storage can be initiated and/or additionally stored in other B-party cameras than already previously stored, in order to increase the overall data security of the system.

When a camera receives data from B-party cameras, these are stored, on the one hand, in the camera-based random access memory and, on the other hand, a corresponding notice is deposited in a file table of the random access memory or, respectively, a data base, relating to which time, which camera or which image storage triggering events the video data from the B-party cameras are related to.

If then images from a surveillance camera are needed for a certain event or for a particular period, a corresponding signal can then be sent to this camera by the central station. If the camera conveys the video data and there is no doubt of the authenticity of the stored video data, there is no necessity for an enquiry from other cameras where the requested camera has stored its video data and it will not be carried out. If, however, there is doubt of the authenticity of the video data retrieved from the local random access memory of the camera or these video data cannot be retrieved at all, for example due to a camera defect, a broadcast signal can be sent to all cameras of the surveillance system and the corresponding video data can be retrieved from the memories deposited there. If necessary, this can also be done regularly for checking purposes, during which processes it is then possible to check automatically whether the image stored in a surveillance camera itself and all corresponding images stored in memories in B-party cameras, which have been recorded at a certain time, correspond to one another. If this is not the case, a warning signal can be output in order to notify a sabotage attempt or data corruption.

If the memory fills up in a camera during its operation, a signal can be output to B-party cameras conveying video data and/or the central station can be informed, especially above a certain limit threshold, especially if the video data filling the local memory are not yet particularly old. This makes it possible to initiate that either a storage takes place in the central station and thus the local memory can be released again before its filling level is reached and/or that the B-party cameras sending video data perform a corresponding reprioritization and address, instead of the camera with a local memory approaching maximum filling, other B-party cameras for video data protection purposes.

It should be pointed out that due to the possibility of requesting video data from other cameras for storage purposes, it may be sufficient to arrange individual cameras according to the invention in a surveillance system in order to obtain increased security overall without excessive network loading. This facilitates the upgrading of existing systems.

What is claimed is:

1. A surveillance camera system comprising: a series of cameras of which at least one is a surveillance camera having a network interface and storage means for video data storage within the surveillance camera, said series of cameras also including a plurality of other cameras that are accessible by the surveillance camera via the network interface for also storing video data from the surveillance camera and wherein the surveillance camera is provided with a selection means for selecting which of the other cameras, accessible via the network interface, are to be used for also storing video data of the surveillance camera; wherein the selection means is adapted to take into consideration in the selection at least one of distances determined by round trip times of data packets to the plurality of other cameras accessible via the network interface, distances to the other cameras accessible via the network interface determined by GPS sensors in the other cameras, and indications of the hazards the other cameras are exposed to, said indications being provided as information relating to the constructional adaption of the other cameras to hazards, the information being stored with the other cameras and transmitted from one camera to other cameras when the network structure is determined.

2. The surveillance camera system as claimed in claim 1, wherein the selection means is adapted to take into consideration in the selection both distances determined by round trip times of data packets to the plurality of other cameras accessible via the network interface, and distances to the other cameras accessible via the network interface determined by GPS sensors in the other cameras.

3. The surveillance camera system as claimed in claim 1, wherein the selection means is adapted to take into consideration in the selection distances to the other cameras accessible via the network interface determined by GPS sensors in the other cameras.

4. A surveillance camera system comprising: a series of cameras of which at least one is a surveillance camera having a network interface and storage means for video data storage within the surveillance camera, said series of cameras also including a plurality of other cameras that are accessible by the surveillance camera via the network interface for also storing video data from the surveillance camera and wherein the surveillance camera is provided with a selection means for selecting which of the other cameras, accessible via the network interface, are to be used for also storing video data of the surveillance camera; wherein the selection means is adapted to take into consideration in the selection at least indications of the hazards that the other cameras are exposed to, said indications being provided as information relating to the constructional adaption of the other cameras to particular hazards, the information being stored with the other cameras and transmitted from said cameras to other cameras when the network structure is determined.

5. The surveillance camera system as claimed in claim 4, wherein the storage means for storing video data is designed for storing video data in an event-based manner with lead and/or lag with respect to an activating event.

6. The surveillance camera system as claimed in claim 5, wherein the storage means for storing video data designed for storing video data in an event-based manner in response to a trigger signal received from at least one other camera connected via the network interface.

7. The surveillance camera system as claimed in claim 4, wherein the storage means is designed for transmitting video data belonging to an event to several cameras provided for storage, addressable via the network interface.

8. The surveillance camera system as claimed in claim 4, wherein the storage means is designed for storing stored video data in such a manner that on request, all video data from a certain imaging camera or belonging to a certain event can be output selectively.

9. The surveillance camera system as claimed in claim 4, wherein the storage means is designed for time-offset storage in a networked-load-dependent manner.

10. The surveillance camera system as claimed in claim 4, wherein the storage means is designed for receiving video data from several cameras addressable via the network interface.

11. The surveillance camera system as claimed in claim 4, wherein the selection means is adapted to also take into consideration in the selection at least one of distances determined by round trip times of data packets to the plurality of other cameras accessible via the network interface.

12. The surveillance camera system as claimed in claim 11, wherein the selection means is also adapted to take into consideration in the selection distances to the other cameras accessible via the network interface determined by GPS sensors in the other cameras.

13. A surveillance camera system comprising: a series of cameras of which at least one is a surveillance camera having a network interface and storage means for video data storage within the surveillance camera, said series of cameras also including a plurality of other cameras that are accessible by the surveillance camera via the network interface for also storing video data from the surveillance camera and wherein the surveillance camera is provided with a selection means for selecting which other cameras, accessible via the network interface, are to be used for also storing video data of the surveillance camera wherein the selection means is adapted to take into consideration in the selection at least distances determined by round trip times of data packets to the plurality of other cameras accessible via the network interface.

14. The surveillance camera system as claimed in claim 13, wherein the storage means for storing video data is designed for storing video data in an event-based manner with lead and/or lag with respect to an activating event.

15. The surveillance camera system as claimed in claim 14, wherein the storage means for storing video data designed for storing video data is an event-based manner in response to a trigger signal received from at least one other camera connected via the network interface.

16. The surveillance camera system as claimed in claim 14, wherein the storage means is designed for transmitting video data belonging to an event to several cameras provided for storage, addressable via the network interface.

17. The surveillance camera system as claimed in claim 16, wherein the storage means is designed for storing stored video data in such a manner that on request, all video data from a certain imaging camera or belonging to a certain event can be output selectively.

18. The surveillance camera system as claimed in claim 13, wherein the storage means is designed for time-offset storage in a network-load-dependent manner.

19. The surveillance camera system as claimed in claim 13, wherein the storage means is designed for receiving video data from several cameras addressable via the network interface.

20. The surveillance camera system as claimed in claim 13, wherein the selection means is also adapted to take into consideration in the selection distances to the other cameras accessible via the network interface determined by GPS sensors in the other cameras.

* * * * *